United States Patent [19]

Marsh et al.

[11] Patent Number: 4,557,872
[45] Date of Patent: Dec. 10, 1985

[54] BASIC ALKALINE EARTH METAL SULPHONATES

[75] Inventors: John F. Marsh; John A. Cleverley; Dennis J. Simpkin, all of Oxford, England

[73] Assignee: Exxon Research & Engineering Co., Florham Park, N.J.

[21] Appl. No.: 542,504

[22] Filed: Oct. 11, 1983

Related U.S. Application Data

[63] Continuation of Ser. No. 235,924, Feb. 19, 1981, abandoned, and a continuation-in-part of Ser. No. 102,476, Dec. 11, 1979, abandoned.

[30] Foreign Application Priority Data

Dec. 13, 1978 [GB] United Kingdom ............... 48281/78

[51] Int. Cl.$^4$ ............................................. C07B 13/00
[52] U.S. Cl. ............................. 260/504 A; 260/505 N
[58] Field of Search ...................... 260/504 A, 505 N

[56] References Cited

U.S. PATENT DOCUMENTS 2,616,925  11/1952  Asseff et al. .................... 260/505 N
2,777,874   1/1957  Asseff et al. .................... 260/504 A

FOREIGN PATENT DOCUMENTS 1166744  10/1969  United Kingdom .

Primary Examiner—Alan Siegel
Attorney, Agent, or Firm—John J. Mahon

[57] ABSTRACT

Oil soluble basic magnesium sulphonates useful as lubricating oil additives are prepared by blowing carbon dioxide through a mixture of sulphonic acid or its sulphonate, magnesium oxide, a hydrocarbon solvent, water, a $C_3$ to $C_6$ ketone and a reaction promoter.

7 Claims, No Drawings

BASIC ALKALINE EARTH METAL SULPHONATES

CROSS REFERENCE TO RELATED APPLICATIONS

This is a continuation of application Ser. No. 235,924, filed 02-19-81, now abandoned, and a continuation-in-part of our U.S. Ser. No. 102,476, filed Dec. 11, 1979, now abandoned.

The present invention relates to the production of basic alkaline earth metal sulphonates, especially basic magnesium sulphonates. The basic alkaline earth metal sulphonates produced by the present invention are particularly useful as additives for lubricating oils and the present invention also provides lubricating oils containing these basic alkaline earth metal sulphonates. The term basic alkaline earth metal sulphonate is used to describe materials containing a stoichiometric excess of the metal compared to that required to neutralize the sulphonic acid.

Basic alkaline earth metal sulphonates are well known, as is their use as additives for lubricants. Barium, calcium and magnesium sulphonates, have been used and many methods have been proposed for their production. The preferred techniques are the carbonation of an oil solution of a reaction mixture containing a sulphonic acid or sulphonate, an excess of a compound of the alkaline earth metal, generally the alkoxide, oxide or hydroxide, usually a hydrocarbon solvent, and in the presence of reaction promoter systems often comprising an alcohol and/or water, sometimes together with a copromoter.

It is important that where the highly basic sulphonates are to be used as additives for lubricating oils they be not too viscous, are free of sediment, are soluble in the oil and do not cause the lubricating oil to be hazy. It is also preferred that they have as high a Total Base Number (TBN), being the number of milligrams of KOH equivalent to 1 gram of the product when titrated with strong acid, as possible since this results in the most economic use of the metal. It is also important that the compound perform well as an additive in an oil in use in an engine.

It is well known that different reaction conditions and promoter systems are suitable for different alkaline earth metals. It is also known that the production of basic magnesium sulphonates presents greater difficulties than producing barium and calcium sulphonates and many of the first techniques proposed for producing magnesium sulphonates required magnesium metal as starting material, as for example in U.S. Pat. No. 3,150,089. Since then, various reaction promoter systems have been proposed for the production of basic magnesium sulphonates from magnesium oxide. For example, U.K. Pat. No. 1166744 is concerned with the use of mixtures of alcohol, water and amines as promoters; U.K. Pat. No. 1297150 describes the use of oil soluble carboxylic acids and water optionally with an alcohol; whilst U.K. Pat. No. 1399092 relates to the use of amine salts of carboxylic acids, alcohol and water.

We have now discovered that the alcohol previously used as promoter/solvent in these processes may be replaced by $C_3$ to $C_6$ mono ketones in the production of highly basic magnesium sulphonates from magnesium oxide.

The present invention therefore provides a process for the production of basic magnesium sulphonates comprising carbonating a mixture containing:
(a) an oil soluble sulphonate or sulphonic acid,
(b) a stoichiometric excess of a magnesium oxide above that required to react with (a),
(c) a hydrocarbon solvent,
(d) water,
(e) a $C_3$ to $C_6$ mono ketone, and
(f) one or more reaction promoters selected from the group consisting of carboxylic acids or salts thereof, amines, and $C_4$ to $C_6$ diketones.

The sulphonate or sulphonic acid used in the process of this invention may be natural or synthetic, the synthetic alkylaryl sulphonates and sulphonic acids being preferred.

The basic magnesium sulphonates with which this invention is concerned may be an oil solution of the magnesium sulphonate which itself acts as a surfactant to disperse the excess magnesium which is present as colloidal magnesium derivatives such as carbonate, oxide and hydroxide. Thus it is important that the sulphonate or sulphonic acid be oil soluble.

The excess of the magnesium compound provides the basicity of the compound and the amount of magnesium that should be used depends upon its quality and the desired TBN of the product. The excess may be achieved by starting with the sulphonic acid and adding an amount of magnesium necessary to give the required excess after reaction with the acid, or by starting with magnesium sulphonate and then adding the required excess. We prefer to use from 1 to 45, more preferably 1 to 25 equivalents of magnesium for each equivalent of sulphonic acid present in the reaction mixture, this would include magnesium present if a sulphonate is used as the starting material in which case the equivalents of sulphonic acid from which the sulphonate is derived would be the number of equivalents of acid.

The hydrocarbon solvent is used in an amount sufficient to keep the reaction mixture fluid during carbonation and may be aliphatic such as hexane or heptane, or aromatic such as benzene, toluene or xylene, toluene being the preferred solvent. We find that 5 parts by weight of hydrocarbon solvent per part of alkaline earth metal compound is particularly suitable.

We have found that the $C_3$ to $C_6$ mono ketones are particularly useful reaction solvents or promoters. Our preferred material is acetone. The exact operation of the ketones is uncertain. It is our belief that whilst the initial reaction to form the colloidal species takes place in the water phase, the ketone then assists the transfer of the colloid from the water to the oil phase by promoting immiscibility between the phases. The amount of ketone that should be used depends upon the amounts of the other ingredients, especially the amount of the excess of the magnesium compound. We prefer to use from 0.5 to 4 parts, preferably from 0.5 to 2 parts by weight of the ketone based on the total weight of the magnesium oxide, that is, per part by weight of the magnesium oxide.

We have found that in order to obtain satisfactory products, water should be added to the reaction mixture. The amount of water that should be added will depend upon the quality of the magnesium compound and the amount of excess magnesium compound present. We prefer to use from 0 to 2, more preferably 0.5 to 2 parts by weight of water based on the total amount of magnesium oxide.

We have also found that reaction promoters should also be included in the reaction mixture to obtain satisfactory products. Examples of suitable promoters include amines such as those described in U.K. Pat. No. 1166744, oil soluble carboxylic acids such as those of U.K. Pat. No. 1297150, the amine salts of carboxylic acids as described in U.K. Pat. No. 1399092 and the $C_4$ to $C_6$ diketones of our copending Application No. 48322/78 corresponding to U.S. patent application Ser. No. 102,802. Mixtures of these promoters may also be used. Without the promoter virtually none of the excess of the magnesium compound is converted to the metal carbonate and it remains as the insoluble metal compound giving high sediment, poor filterability and low TBN. We prefer to use from 0.02 to 1.5 parts by weight of promoter based on the total amount of the magnesium metal compound.

The addition of an oil soluble alkyl phenol to the reaction mixture is also useful in that it can give rise to products of improved viscosity. The alkyl phenols may be simple phenols, such as nonyl phenol, decyl and dodecyl phenol or bridged phenols of the general formula:

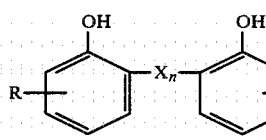

where R is an alkyl group containing at least 8 carbon atoms, X is sulphur or ($CH_2$) and n is 1 or 2. The amount of the phenol that should be incorporated depends upon the nature of the other ingredients, but in our preferred process for the production of basic magnesium sulphonates from magnesium oxide, we prefer to use from 0 to 1 parts by weight based on the total weight of magnesium oxide present in the reaction mixture.

It should be appreciated that within the ranges of amounts specified above, the preferred amounts of materials to be used will depend upon the relative proportions of all the various components in the reaction mixture.

Carbonate content of the final product can be controlled by stopping carbonation of the reaction mixture at any particular moment. Alternatively, carbonation may be continued until there is no further significant uptake of carbon dioxide. The temperature of carbonation is not critical. The minimum temperature that may be used is that at which the reaction mixture remains fluid and the maximum is the decomposition temperature of the component with the lowest decomposition temperature. We prefer to carry out the carbonation at the reflux temperature which depends upon the components of the reaction mixture and the pressure. Generally carbonation is effected at a temperature in the range 25°–200° C., preferably 50°–150° C. The use of the ketone as reaction promoter is equally applicable to processes involving more than one carbonation stage and in which various components of the reaction mixture are added or removed between carbonation stages. We have found that staged addition of magnesium oxide and water can lead to further increase in the basicity of the product.

After carbonation the product is stripped to remove the volatile materials such as the ketone, water, solvent and volatile promoters. The remaining solids in the reaction mixture are removed preferably by filtration or centrifugation. The product may be stripped first and then filtered or vice versa. Further carbon dioxide may be passed through the reaction mixture during stripping. The final product is thus obtained as an oil solution of the basic magnesium sulphonate.

The basic magnesium sulphonates obtained from the process of the present invention are useful as additives for lubricants where their basicity neutralises acids formed by the operation of the engine and the surfactant part of the compound helps disperse unwanted residues in the oil to reduce the formation of harmful deposits. They also enhance the antirust properties of the lubricant. The amount of the sulphonate that should be included in the oil depends upon the type of oil concerned and its application. For crankcase oils, we prefer to use from 0.01% to 5 wt.% based on the weight of the oil.

The basic magnesium sulphonates of this invention may be used in a wide variety of lubricating oils. The oils may be natural or synthetic or mixtures thereof and the main uses are in crankcase lubricants, two cycle and aviation lubricants.

The sulphonates may be used in combination with other conventional additives for lubricating oils such as for example other highly basic metal additives, particularly other alkaline earth metal sulphonates and alkaline earth metal phenates and sulphurised phenates. In addition the oils may contain ashless dispersants such as the products obtained by the reaction of polyamines or polyols with polyisobutylene succinic anhydride, and anti-oxidants, antiwear agents and anti corrosion additives such as the well known zinc dialkyldithiophosphates. The oils may also contain viscosity index modifiers such as the well known olefine copolymers.

The present invention is illustrated but in no way limited by reference to the following examples in which a reaction mixture was prepared at room temperature in a flask fitted with a reflux condenser. Carbon dioxide was introduced into the reaction mixture and the temperature of the mixture allowed to rise to the reflux temperature where carbonation was continued for 2 hours with the carbon dioxide being introduced. After the desired amount of carbon dioxide had been introduced, carbonation was stopped and the temperature of the mixture raised to 150° C. and vacuum stripped to remove volatile materials after which the mixture was cooled and filtered at 150° C. to yield an oil solution of the required basic magnesium sulphonate.

The quantities of the materials used in the various preparations and the TBN of the product are given in Table 1, wherein:

Sulfonic Acid is a 90 wt. % (active ingredient) oil solution of a $C_{24}$ branched chain (polypropylene)alkyl benzene sulfonic acid.

Magnesium sulfonate is a 46 wt.% (active ingredient) oil solution of the neutral magnesium salt of the said $C_{24}$ branched chain alkyl benzene sulfonic acid on a molar basis of 1 mole of magnesium per 2 moles of sulfonic acid.

Oil was a paraffinic mineral lubricating oil of about 150 cs. at 100° F.

TABLE I

| Run No. | 1 | 2 | 3 | 4 | 5* | 6 | 7 | 8 |
| --- | --- | --- | --- | --- | --- | --- | --- | --- |

TABLE I-continued

| Components, grams | | | | | | | | |
|---|---|---|---|---|---|---|---|---|
| Sulphonic Acid | 81.6 | 81.6 | | | 81.6 | | | |
| Magnesium Sulphonate | | | 163 | 163 | | 163 | 163 | 163 |
| Magnesium Oxide | 49.0 | 51.1 | 46.0 | 46.0 | 49.0 | 45.8 | 47.2 | 47.2 |
| Oil (Amount) | 54.2 | 119.3 | 49.2 | 33.5 | 88.4 | 45.8 | 49.2 | 45.8 |
| Acetone | 35.0 | 35.0 | 35.0 | 35.0 | 35.0 | 39.6 | 35.0 | 35.0 |
| Solvent | Toluene | Toluene | Toluene | Toluene | Toluene | Toluene | Hexane | Hexane |
| (Amount) | 256 | 256 | 256 | 256 | 256 | 256 | 198.1 | 198.1 |
| Water | 25 | 45 | 45 | 45 | 45.0 | 50.9 | 45.0 | 45.0 |
| Promoters 1. | Formic Acid 8.0 | Ethylene diamine 5.0 | Ethylene diamine 5.0 | n-decanoic Acid 28.7 | Ethylene diamine 5.0 | Acetyl Acetone 8.4 | Ethylene diamine 5.0 | Acetyl Acetone 8.4 |
| 2. | | | Formic Acid 8.0 | | n-decanoic Acid 28.7 | Formic Acid 8.0 | Formic Acid 8.0 | Formic Acid 8.0 |
| 3. | | | | | | | | |
| Carbonation | | | | | | | | |
| Time | 2 hrs | 2 hrs | 3 hrs | 2 hrs | 2 hrs | 3 hrs | 2 hrs. | 2 hrs |
| Rate | 200 cc/min | Variable | 200 cc/min | 384 cc/min | 384 cc/min | 92 cc/mi | 200 cc/min | 200 cc/min |
| Temp. | 60° C. | 60° C. | 60° C. | 50° C. | Room temp. | 60° C. | 40° C. | 45° C. |
| TBN mg KOH/g | 198 | 273 | 297 | 326 | 322 | 330 | 265 | 347 |

*25 g Nonyl phenol also included.

| Run No. | 9 | 10 | 11 | 12 | 13 | 14 | 15 | 16 |
|---|---|---|---|---|---|---|---|---|
| Components, grams | | | | | | | | |
| Sulphonic Acid | | | | 81.6 | 81.6 | | 81.6 | 81.6 |
| Magnesium Sulphonate | 163 | 163 | 163 | | | 163 | | |
| Magnesium Oxide | 47.2 | 53.4 | 53.4 | 49.0 | 51.1 | 47.2 | 51.1 | 51.1 |
| Oil (Amount) | 40.8 | 53.8 | 45.8 | 113.3 | 113.3 | 43.6 | 85.3 | 85.3 |
| Acetone | 35.0 | 39.6 | 39.6 | 30.5 | 35.0 | 35.0 | 35.0 | 35.0 |
| Solvent | Hexane | Heptane | Heptane | Heptane | Heptane | Heptane | Heptane | Toluene |
| (Amount) | 198.1 | 205.6 | 205.6 | 205.6 | 205.6 | 205.6 | 256 | 256 |
| Water | 45.0 | 50.9 | 50.9 | 45.0 | 45.0 | 45.0 | 39 | 39 |
| Promoters 1. | Acetyl Acetone 8.4 | Acetyl Acetone 8.4 | Acetyl Acetone 8.4 | Acetyl Acetone 8.4 | Ethylene diamine 5.0 | Ethanol amine 10.6 | Ammonium Hydroxide 8.1 g | Ammonium Hydroxide 8.1 |
| 2. | Formic Acid 8.0 | | Formic Acid 8.0 | Ethylene diamine 5.0 | Formic Acid 2.0 | Formic Acid 8.0 | N—decanoic Acid 28.7 | N—decanoic Acid 28.7 |
| 3. | Ethylene diamine 5.0 | | | | | | | |
| Carbonation | | | | | | | | |
| Time | 6 hrs | 2 hrs | 6 hrs | 3 hrs | 3 hrs | 2 hrs | 3 hrs | 3 hrs |
| Rate | 92 cc/min | 200 cc/min | 92 cc/min | 137 cc/min | 137 cc/min | 200 cc/min | 137 cc/min | 137 cc/min |
| Temp. | 48° C. | 60° C. | 60° C. | 60° C. | 60° C. | 60° C. | 60° C. | 60° C. |
| TBN mg KOH/g | 351 | 220 | 405 | 380 | 410 | 311 | 341 | 283 |

| Run No. | 17 | 18 | 19 |
|---|---|---|---|
| Components, grams | | | |
| Sulphonic Acid | 98 | 81.6 | 81.6 |
| Magnesium Sulphonate | | | |
| Magnesium Oxide | 51.8 | 51.1 | 51.1 |
| Oil (Amount) | 108 | 110 | 110 |
| Acetone | 48 | 35 (THF)* | 35 (MEK)** |
| Solvent | Xylene | Heptane | Heptane |
| (Amount) | 200 | 256 | 256 |
| Water | 20.5 + 20.0*** | 45 g | 45 g |
| Promoters 1. | Ethylene Diamine 6.8 | Ethylene Diamine 50 | Ethylene Diamine 50 |
| 2. | | Formic Acid 8.0 | Formic Acid 8.0 |
| 3. | | | |
| Carbonation | | | |
| Time | 4½ hrs | 3 hrs | 3 hrs |
| Rate | 160° C. | 137° C. | 137° C. |
| Temp. | 80° C. | 55° C. | 55° C. |
| TBN mg KOH/g | 358 | 150 | 180 |

***A two stage carbonation process in which 20.5 grams of water were first added and the material carbonated to saturation and 20.0 further grams of water added and the mixture carbonated again.
*THF = Tetrahydrofuran
**MEK = Methyl ethyl ketone

What is claimed is:

1. A process for the production of oil soluble basic magnesium sulphonates useful as lubricating oil additives comprising carbonating with carbon dioxide a mixture containing
   (a) an oil soluble sulphonic acid or a magnesium sulphonate thereof;

(b) excess of magnesium oxide above that required to react with any free sulphonic acid that may be present, said excess being reacted with said carbon dioxide;
(c) a hydrocarbon solvent;
(d) water in an amount of 0.5 to 2 parts by weight based on the total amount of magnesium oxide used;
(e) a $C_3$ to $C_6$ monoketone in an amount of 0.5 to 4 parts by weight based on the total amount of magnesium oxide used; and
(f) one or more reaction promoters selected from the group consisting of carboxylic acids or salts thereof, amines, and $C_4$ to $C_6$ diketones in an amount of 0.02 to 1.5 parts by weight based on the total amount of magnesium oxide used.

2. A process according to claim 1, in which the carbonation is effected at a temperature in the range 25° to 200° C.

3. A process according to claim 1, in which from 0.02 to 1 part by weight of the promoter based on the total amount of the magnesium compound present is used.

4. A process according to claim 1, in which the promoter is ethylene diamine.

5. A process according to claim 1, wherein said ketone is acetone and wherein said promoter is selected from the group consisting of formic acid, ethylene diamine, n-decanoic acid, ammonium hydroxide, and acetyl acetone, and combinations thereof.

6. A process according to claim 1, comprising carbonation of a mixture of alkyl benzene sulfonic acid, magnesium oxide, toluene solvent, water, acetone and a promoter selected from the group consisting of formic acid, ethylene diamine, n-decanoic acid and acetyl acetone.

7. A process according to claim 6, wherein said mixture includes mineral oil.

* * * * *